Dec. 29, 1936.    J. SIEGFRIED    2,065,876
MOTOR VEHICLE LIGHTING SYSTEM
Filed Jan. 30, 1936
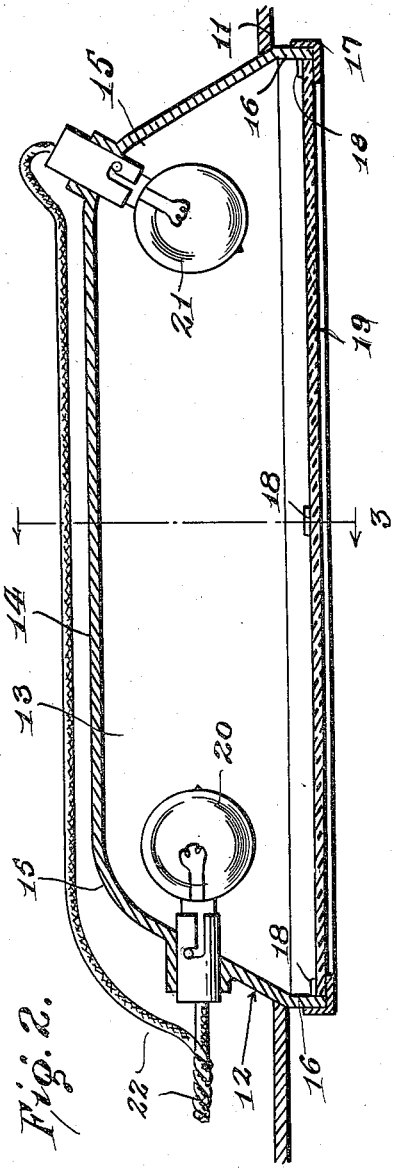
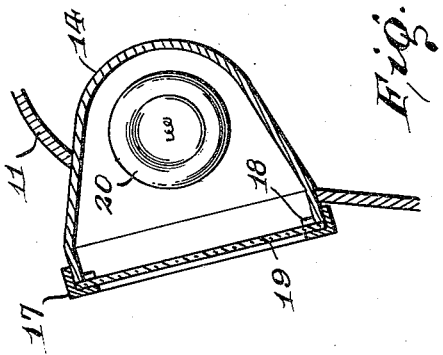
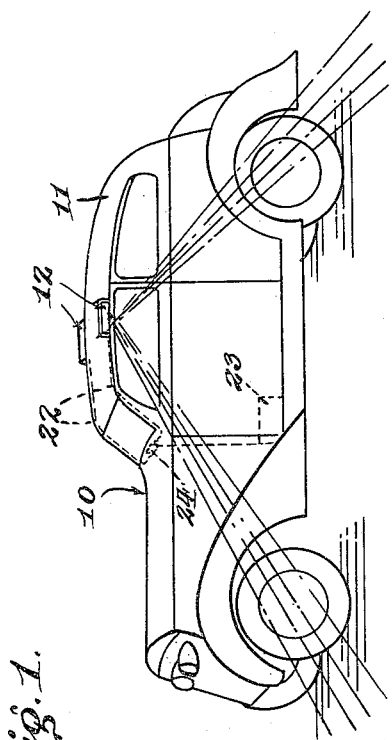
Inventor
Jacob Siegfried,
By Christian R. Nielsen.
Attorney Patented Dec. 29, 1936

2,065,876

UNITED STATES PATENT OFFICE 2,065,876

MOTOR VEHICLE LIGHTING SYSTEM

Jacob Siegfried, Fuquay Springs, N. C.

Application January 30, 1936, Serial No. 61,583

1 Claim. (Cl. 240—8.2)

My invention relates to vehicle lighting and more particularly to a system of exterior lighting, increasing the safety of driving a vehicle at night and it consists in the constructions, arrangements, and combinations herein described and claimed.

It is an object of the invention to provide a light which may be built in or suitably mounted upon the sides of a vehicle body in such location as to project beams of light forwardly of and to the rear of the vehicle, as well as laterally to the sides thereof, thereby illuminating the highway surface on the sides of the car, thus eliminating the treacherous "blind" spot so common when passing a car equipped with strong or bright headlights.

It is a further object of the invention to provide a light which may be employed for signalling right and left turns, as well as one which may be utilized for repair work, camping light, and various other uses.

Additional objects, advantages and features of invention will be apparent from the following description, considered in conjunction with the accompanying drawing, wherein Figure 1 is a perspective view of a vehicle equipped with my invention.

Figure 2 is a longitudinal sectional view through one of the lighting units.

Figure 3 is a cross section on the line 3—3 of Figure 2.

There is illustrated generally, a motor vehicle 10, in the top 11 of which there are mounted lighting units 12. The units 12 are mounted approximately half way between the upper front and rear portions of the vehicle body, and in the present instance are shown as built in the body, although for use upon motor vehicles not originally equipped with the lights, the units may include any suitable brackets for mounting thereof.

Attention is directed now to Figures 2 and 3 wherein it may be clearly seen that the lighting unit comprises a casing 13 of elongated formation, the rear portion 14 of which is rounded and the end portions 15 extend forwardly at a slight angle toward the front of the casing, from whence the casing 13 extends at right angles as at 16, at short distance, to receive a rim 17. Upon the interior of the casing 13 spaced slightly from the open front thereof lugs 18 are formed, providing seats against which a glass panel 19 may rest, the rim 17 engaging the outer surfaces of the glass panel, thus firmly retaining the glass across the front of the casing. The rim 17 may be retained upon the casing in any suitable manner.

Within the casing 13 there are mounted a pair of incandescent bulbs 20 and 21, the bulb 20 being mounted in a plane parallel with the longitudinal axis of the casing, while the bulb 21 is set at an angle thereto, so that the rays of light emanating from the bulb will be reflected in a more lateral direction than those of the bulb 20. The interior surface of the casing may be of any suitable reflecting material or if desired, separate reflectors may be employed for each bulb. The bulbs 20—21 are connected in series through conductor wires 22, which are in circuit with a battery 23. A two-way switch 24, of conventional construction, is mounted upon the dash, for selective control of respective lighting units 12, and for this purpose, is interposed between the battery and the lighting units.

Preferably, the bulbs 20—21 will be of greater candle-power than the bulbs of the headlights of the vehicle since it has been found in actual practice that strong headlight bulbs are unnecessary, where the highway immediately to the side of the vehicle is illuminated. Thus, the danger inherent by the use of blinding headlights is overcome, as well as providing illumination at a point where most needed. It will be apparent that the bulb 21 will direct rays of light well in advance of the vehicle as well as laterally, and the bulb 20 will direct rays of light rearwardly, and laterally, and when so energized will provide a lighted area upon the highway in the line of travel, whether it be forward or backwardly.

The lighting arrangement is such that the units 12 may be selectively energized by means of the switch 24, to indicate right and left turns, and also it will be apparent that the units 12 will be highly efficient in illumination for repair work, camping parties, etc.

While I have shown and described certain preferred constructions, it will be understood that changes may be made within the scope of the appended claim.

I claim:—

A motor vehicle lighting system comprising a casing member mounted at substantially the highest point of the vehicle body and intermediate the length thereof, said casing member having an interior reflecting surface and a transparent front, a bulb mounted in one end of the casing and lying in a plane longitudinal of the casing, a second bulb mounted in the casing opposite the first named bulb and positioned at an angle to the first named bulb whereby to direct forward and lateral rays of light and means for energizing the bulbs.

JACOB SIEGFRIED.